(12) United States Patent
Ko et al.

(10) Patent No.: US 7,320,538 B2
(45) Date of Patent: Jan. 22, 2008

(54) OPTICAL FILM HAVING A STRUCTURED SURFACE WITH CONCAVE PYRAMID-SHAPED STRUCTURES

(75) Inventors: Byung-Soo Ko, Hwasung (KR); Leland R. Whitney, St. Paul, MN (US); Mark E. Gardiner, Santa Rosa, CA (US); Dongwon Chae, Hwasung (KR)

(73) Assignee: 3M Innovative Properties Company, St. Paul, MN (US)

( * ) Notice: Subject to any disclaimer, the term of this patent is extended or adjusted under 35 U.S.C. 154(b) by 132 days.

(21) Appl. No.: 11/026,872

(22) Filed: Dec. 30, 2004

(65) Prior Publication Data

US 2006/0146566 A1  Jul. 6, 2006

(51) Int. Cl.
*F21V 7/04* (2006.01)

(52) U.S. Cl. .................... 362/606; 362/619; 362/628; 362/339

(58) Field of Classification Search ............... 362/330, 362/307–309, 339, 600–634; 359/599; 349/61–64; 385/129–130
See application file for complete search history.

(56) References Cited

U.S. PATENT DOCUMENTS

| | | | |
|---|---|---|---|
| 3,532,876 A | 10/1970 | Muller et al. | |
| 4,576,850 A | 3/1986 | Martens | |
| 5,254,390 A | 10/1993 | Lu | |
| 5,592,332 A | 1/1997 | Nishio | |
| 5,771,328 A | 6/1998 | Wortman et al. | |
| 5,919,551 A | 7/1999 | Cobb, Jr. et al. | |
| 5,932,626 A | 8/1999 | Fong et al. | |
| 6,157,486 A | 12/2000 | Benson, Jr. et al. | |
| 6,174,064 B1 | 1/2001 | Kalantar et al. | |
| 6,208,466 B1 | 3/2001 | Liu | |
| 6,280,063 B1 | 8/2001 | Fong et al. | |
| 6,347,874 B1 | 2/2002 | Boyd et al. | |
| 6,368,699 B1 | 4/2002 | Gilbert | |
| 6,429,919 B1 | 8/2002 | Takatsuka et al. | |
| 6,469,755 B1 | 10/2002 | Adachi et al. | |
| 6,505,959 B2 | 1/2003 | Masaki et al. | |
| 6,602,596 B2 | 8/2003 | Kimura | |
| 6,606,133 B1 | 8/2003 | Okabe | |
| 6,752,505 B2 * | 6/2004 | Parker et al. | ............... 362/627 |
| 6,825,984 B2 | 11/2004 | Kashima et al. | |
| 6,827,456 B2 * | 12/2004 | Parker et al. | ............... 362/629 |

(Continued)

FOREIGN PATENT DOCUMENTS

EP  0 621 500  10/1994

(Continued)

OTHER PUBLICATIONS

Trace Pro, Software for Opto-Mechanical Modeling, User's Manual, Release 3.0, Chapter 1, Introduction and pp. 3.25-3.34 and 4.1-4.4, date Sep. 12, 2002.

*Primary Examiner*—Sandra O'Shea
*Assistant Examiner*—Bao Q. Truong

(57) ABSTRACT

Optical films are disclosed, which have a structured surface including a plurality of concave pyramid-shaped structures, each structure having a base including at least two first sides and at least two second sides. In addition, optical devices are disclosed that incorporate the optical films, for example, such that a first surface of the optical film is disposed to receive light from a light source and the structured surface faces away from the light source.

11 Claims, 11 Drawing Sheets

U.S. PATENT DOCUMENTS

| | | |
|---|---|---|
| 6,848,795 B2 | 2/2005 | Kaminsky et al. |
| 6,888,595 B2 * | 5/2005 | Umemoto .................. 349/113 |
| 6,997,595 B2 | 2/2006 | Mi et al. |
| 2001/0046134 A1 | 11/2001 | Masaki et al. |
| 2001/0053075 A1 * | 12/2001 | Parker et al. ................. 362/31 |
| 2002/0080598 A1 * | 6/2002 | Parker et al. ................. 362/31 |
| 2002/0097496 A1 | 7/2002 | Lu |
| 2003/0082314 A1 | 5/2003 | Higashi et al. |
| 2003/0164906 A1 | 9/2003 | Arakawa et al. |
| 2003/0234900 A1 | 12/2003 | Kim |
| 2004/0114346 A1 | 6/2004 | Parker et al. |
| 2005/0024754 A1 | 2/2005 | Epstein et al. |
| 2005/0074579 A1 | 4/2005 | Suzuki et al. |
| 2005/0099822 A1 | 5/2005 | Choi et al. |
| 2005/0099823 A1 | 5/2005 | Choi et al. |
| 2005/0248848 A1 | 11/2005 | Whitehead |
| 2005/0275945 A1 | 12/2005 | Brickey et al. |
| 2006/0002149 A1 | 1/2006 | Lee |
| 2006/0039073 A1 | 2/2006 | Lee |
| 2006/0146566 A1 | 7/2006 | Ko et al. |
| 2006/0152943 A1 | 7/2006 | Ko et al. |
| 2007/0010594 A1 | 1/2007 | Wang et al. |

FOREIGN PATENT DOCUMENTS

| | | |
|---|---|---|
| EP | 0 650 077 | 4/1995 |
| EP | 1 055 944 | 11/2000 |
| EP | 1 098 209 | 5/2001 |
| EP | 1 491 919 | 12/2004 |
| JP | 06308485 | 4/1994 |
| JP | 1996166502 A | 6/1996 |
| JP | 8-271888 | 10/1996 |
| JP | 2003240911 | 8/2003 |
| JP | HEI-7-159607 | 3/2005 |
| KR | 2003-0065102 | 8/2003 |
| WO | WO 2006/055112 | 5/2006 |
| WO | WO 2006/073616 | 7/2006 |

* cited by examiner

OPTICAL FILM HAVING A STRUCTURED SURFACE WITH CONCAVE PYRAMID-SHAPED STRUCTURES

FIELD OF INVENTION

The invention relates generally to light-transmissive optical films with a plurality of pyramid-shaped concave structures and optical devices incorporating such optical films.

BACKGROUND INFORMATION

A liquid crystal display ("LCD") is used in a variety of applications including, for example, televisions, hand-held devices, digital still cameras, video cameras, and computer monitors. An LCD offers several advantages over a traditional cathode ray tube ("CRT") display such as decreased weight, unit size and power consumption, as well as increased brightness. However, an LCD is not self-illuminating and, therefore, in some applications, requires a back-lighting assembly or "backlight." A backlight typically couples light from a substantially linear source (e.g., a cold cathode fluorescent tube ("CCFT")) or light emitting diode ("LED") to a substantially planar output. The planar output is then coupled to the LCD.

The performance of an LCD is often judged by its brightness. The brightness of an LCD may be enhanced by using more or brighter light sources. In large area displays it is often necessary to use a direct-lit type LCD backlight to maintain brightness, because the space available for light sources grows linearly with the perimeter, while the illuminated area grows as the square of the perimeter. Therefore, LCD televisions typically use a direct-lit backlight instead of a light-guide edge-lit type LCD backlight. Additional light sources and/or a brighter light source may consume more energy, which is counter to the ability to decrease the power allocation to the display device. For portable devices this may correlate to decreased battery life. Also, adding a light source to the display device may increase the product cost and sometimes can lead to reduced reliability of the display device.

The brightness of an LCD also may be enhanced by efficiently utilizing the light that is available within the LCD (e.g., to direct more of the available light within the display device along a preferred viewing axis). For example, Vikuiti™ Brightness Enhancement Film ("BEF"), available from 3M Corporation, has prismatic surface structures, which redirect some of the light outside the viewing range to be substantially along the viewing axis, and recycle via multiple reflections some of the light between the BEF and the backlight. This results in optical gain substantially along the viewing axis, and also results in improved spatial uniformity of the illumination of the LCD. Thus, BEF is advantageous because it enhances brightness and improves spatial uniformity. For a battery powered portable device, this may translate to longer running times or smaller battery size, and a display that provides a better viewing experience.

SUMMARY

One exemplary implementation of the present disclosure is directed to optical devices including a light source and an optical film having a first surface disposed to receive light from the light source and a structured surface facing away from the light source. The structured surface includes a plurality of concave pyramid-shaped structures, each structure having a base including at least two first sides and at least two second sides.

In another exemplary implementation, the present disclosure is directed to optical films having a first surface and a structured surface. The structured surface includes a plurality of concave pyramid-shaped structures, each structure having a base including at least two first sides and at least two second sides. At least one of the first and second sides of at least one concave pyramid-shaped structures is offset with respect to at least one of the first and second sides of at least one other concave pyramid-shaped structure.

In yet another exemplary implementation, the present disclosure is directed to optical films having a first surface and a structured surface. The structured surface includes a plurality of concave pyramid-shaped structures, each structure having a base including at least two first sides disposed opposite to each other along a first direction and at least two second sides disposed opposite to each other along a second general direction. At least one of the first and second directions of at least one concave pyramid-shaped structure is different from the respective direction of at least one other concave pyramid-shaped structure.

BRIEF DESCRIPTION OF DRAWINGS

So that those of ordinary skill in the art to which the subject invention pertains will more readily understand how to make and use the subject invention, exemplary embodiments thereof are described in detail below with reference to the drawings, wherein.

DETAILED DESCRIPTION

The present disclosure is directed to optical films capable of controlling the distribution of light from a light source and, in some exemplary embodiments, capable of controlling light distribution along two different directions. The optical film according to the present disclosure may be useful in controlling the light distribution for an LCD backlight (e.g., backlights shown in FIGS. 1A-1D).

Figure 1A:
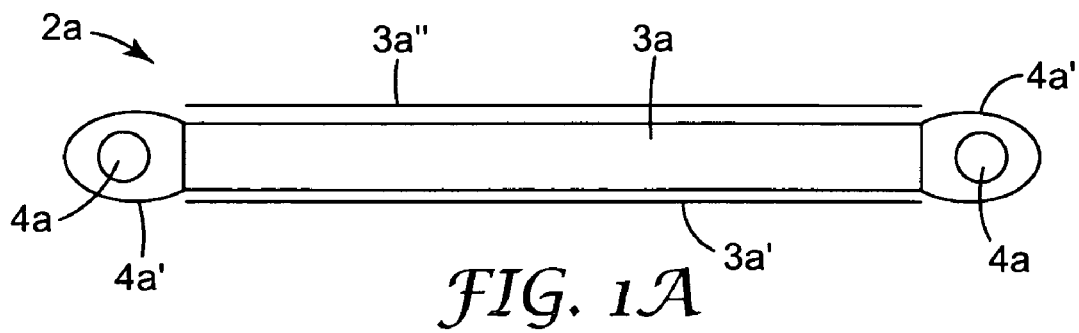
FIG. 1A shows schematically a planar lightguide edge-lit backlight.
Figure 1B:
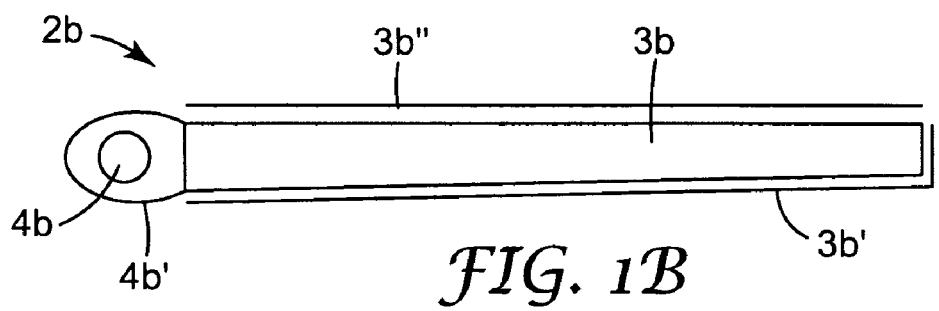
FIG. 1B shows schematically a wedge lightguide edge-lit backlight.
Figure 1C:
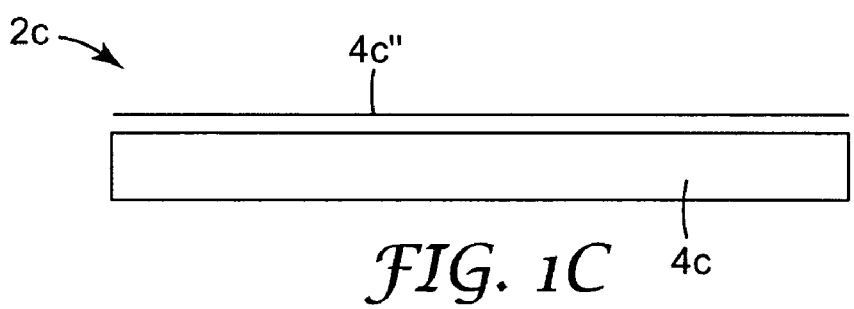
FIG. 1C shows schematically a backlight utilizing an extended light source.
Figure 1D:
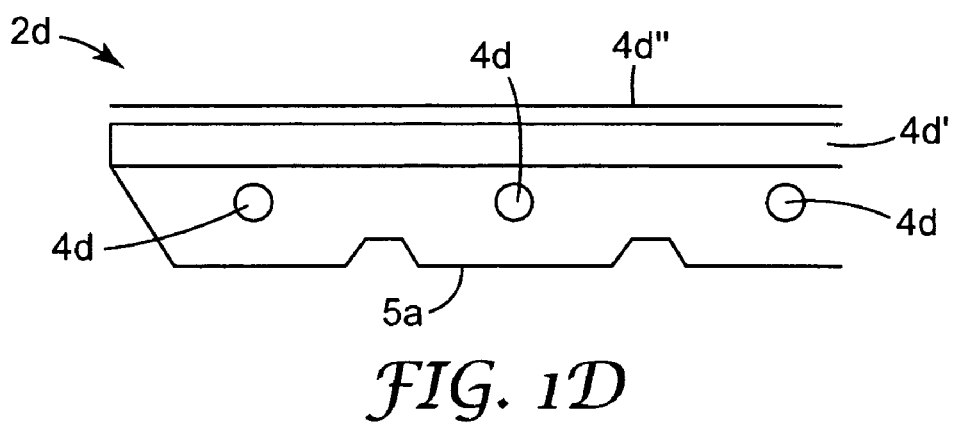
FIG. 1D shows schematically a direct-lit type backlight.

FIGS. 1A-1D show several examples of optical devices, such as backlights that may be used in LCDs. FIG. 1A shows a backlight 2a. The backlight 2a includes light sources 4a, such as one or more cold cathode fluorescent tubes ("CCFT") or arrays of LEDs, that provide light from different sides or edges of the backlight, lamp reflectors 4a' disposed about the light sources 4a, a lightguide 3a, which is illustrated as a substantially planar lightguide, a back reflector 3a' and optical films 3a", which may be any suitable optical films. FIG. 1B shows a backlight 2b including a light source 4b, such as one or more CCFTs or arrays of LEDs, a lamp reflector 4b' disposed about the light source 4b, a lightguide 3b, which is illustrated as a wedge-shaped lightguide, a back reflector 3b' and optical films 3b", which may be any suitable optical films. FIG. 1C shows a backlight 2c, which includes an extended light source 4c. Exemplary suitable extended light sources include surface emission-type light sources. FIG. 1D shows an LCD backlight 2d, which includes three or more light sources (e.g. CCFTs or LEDs) 4d, a back reflector 5a, a diffuser plate 4d' and optical films 4d", which may be any suitable optical films.

Such backlights may be used in various optical devices, and, particularly, display devices such as LCD devices (e.g., televisions, monitors, etc). As one of ordinary skill in the art will understand, a display device may include a case having a window, a backlight situated in the case, an optical film according to the present disclosure, and a light valve arrangement, such as an LCD panel, situated between the optical film and the optical window. The optical film according to the present disclosure also may be used in conjunction with any other light source known to those of ordinary skill in the art and the display device may include any other suitable elements.

Figure 2:
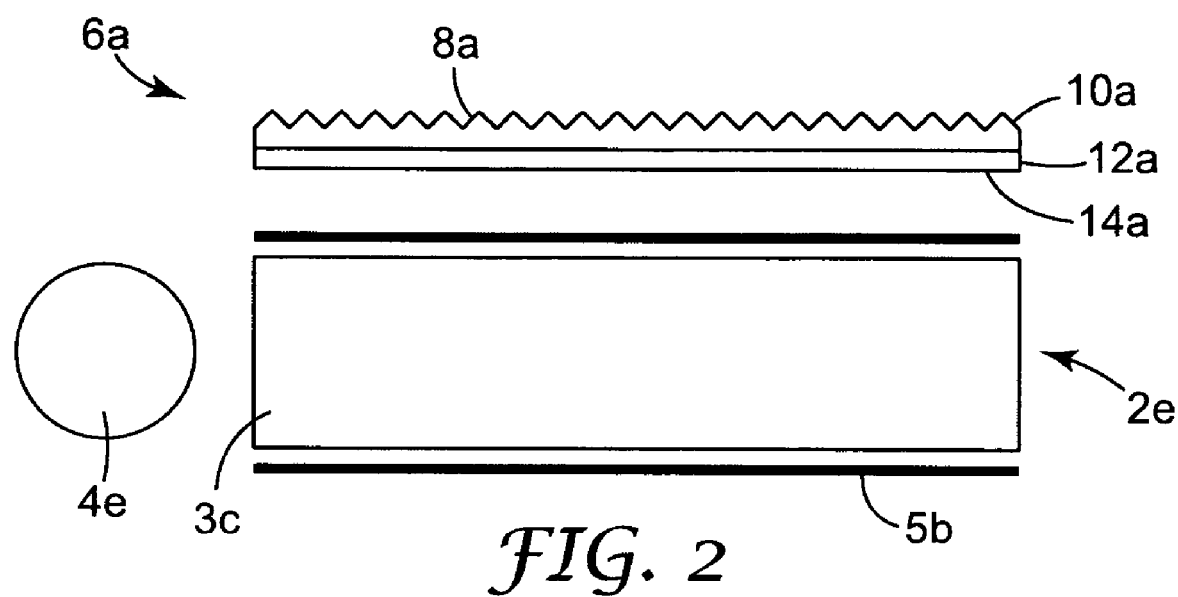
FIG. 2 shows schematically an exemplary embodiment of an optical film according to the present disclosure positioned over a backlight.

FIG. 2 shows a cross-sectional view of a backlight 2e and an optical film 6a according to the present disclosure. The backlight 2e may include a light source 4e, a lightguide 3c, and a back reflector 5b. The optical film 6a may be disposed over the backlight 2e. The optical film 6a according to the present disclosure includes a first surface 14a, which may be a substantially planar surface, a structured surface 10a and, in some exemplary embodiments, a substrate portion 12a. The optical film 6a may be characterized by an axis, which in some embodiments is substantially perpendicular to the first surface or substrate portion 12a and in other exemplary embodiments makes a different angle with respect to the first surface or the substrate portion 12a. The angle of the axis with respect to the first surface or the substrate portion will be determined by the main viewing direction of the display with respect to the plane of the display.

The structured surface 10a includes a plurality of pyramid-shaped concave structures 8a, such as inverted pyramids, which in some exemplary embodiments are rectangular-based inverted pyramids. In other exemplary embodiments, the pyramid-shaped concave structures 8a can be square-based inverted pyramids. The structures 8a may be disposed in the structured surface 10a in close proximity to one another and, in some exemplary embodiments, in substantial contact (e.g., immediately adjacent) with one another. The structures 8a may be two-dimensionally aligned with each other, offset with respect to one another (angularly, transversely or both) or arranged in a random distribution. Suitable offset arrangements of the structures 8a are described in the commonly owned U.S. Application entitled "Optical Film Having a Structured Surface With Offset Prismatic Structures," Ser. No. 11/026,938, filed on even date herewith, the disclosure of which is hereby incorporated by reference herein to the extent it is not inconsistent with the present disclosure.

In some exemplary embodiments, the structures 8a may be spaced from each other at any suitable distance provided that the gain of the optical film 6a is at least about 1.1. For example, the structures 8a may be spaced apart to the extent that the structures occupy at least about 50% of a given useful area of the structured surface 10a, or, in other exemplary embodiments, the structures 8a may be spaced further apart to the extent that the structures occupy no less than about 18% of a given useful area of the structured surface 10a. Some exemplary embodiments of the present disclosure are expected to have an optical gain of at least about 1.2, at least about 1.3 or at least about 1.5.

For the purposes of the present disclosure, the term "gain" refers to the ratio of the axial output luminance of an optical system with an optical film constructed according to the present disclosure to the axial output luminance of the same optical system without such optical film. In typical embodiments of the present disclosure, the size, shape and angles of the concave pyramid-shaped structures are selected to provide an optical gain of at least 1.1. In addition, the spacing, size, shape and angles of the concave pyramid-shaped structures may be selected based on the desired output distribution of light, but the structures should not be so small as to cause diffraction, and at least one of the dimensions of the structures should not be so large as to be seen with an unaided eye. The latter typically occurs for concave structures of about 100 or 150 micron in size or larger. In some exemplary embodiments that are particularly suitable for use in direct-lit backlights, the spacing, size, shape and angles of the pyramid-shaped concave structures can be chosen so that the optical films of the present disclosure aid in hiding light sources from the viewer.

In the exemplary embodiment according to the present disclosure shown in FIG. 2, the structured surface 10a is disposed over the substrate portion 12a. As one of ordinary skill in the art would understand, the optical film 6a may be used to change the direction or, in some exemplary embodiments, other characteristics of light rays emitted from the backlight 2e. For example, some embodiments of the present disclosure allow for the control of the angular spread of light using the pyramid-shaped concave structures 8a of the optical film 6a.

In some exemplary embodiments of the present disclosure, the substrate portion 12a may include an optical film having an additional optical characteristic that is different from the optical characteristics of the structured surface 10a. For example, the optical film may manipulate light in a way that is different from the way light is manipulated by the structured surface 10a. Such manipulation may include polarization, diffusion or additional redirection of light entering the optical films of the present disclosure. Exemplary suitable films having such additional characteristics include, but are not limited to, a polarizer film, a diffuser film, a brightness enhancing film such as BEF, a turning film and any combination thereof. Turning film may be, for example, a reversed prism film(e.g., inverted BEF) or another structure that redirects light in a manner generally similar to that of a reversed prism film. In some exemplary embodiments, the substrate portion 12a may include a linear reflective polarizer, e.g., a multilayer reflective polarizer, such as Vikuity™ Dual Brightness Enhancement Film ("DBEF"), or a diffuse reflective polarizer having a continuous phase and a disperse phase, such as Vikuity™ Diffuse Reflective Polarizer Film ("DRPF"), both available from 3M Company. In other exemplary embodiments, the substrate portion may include a polycarbonate layer ("PC"), a poly methyl methacrylate layer ("PMMA"), a polyethylene terephthalate ("PET") or any other suitable film or material known to those of ordinary skill in the art.

Figure 3A:
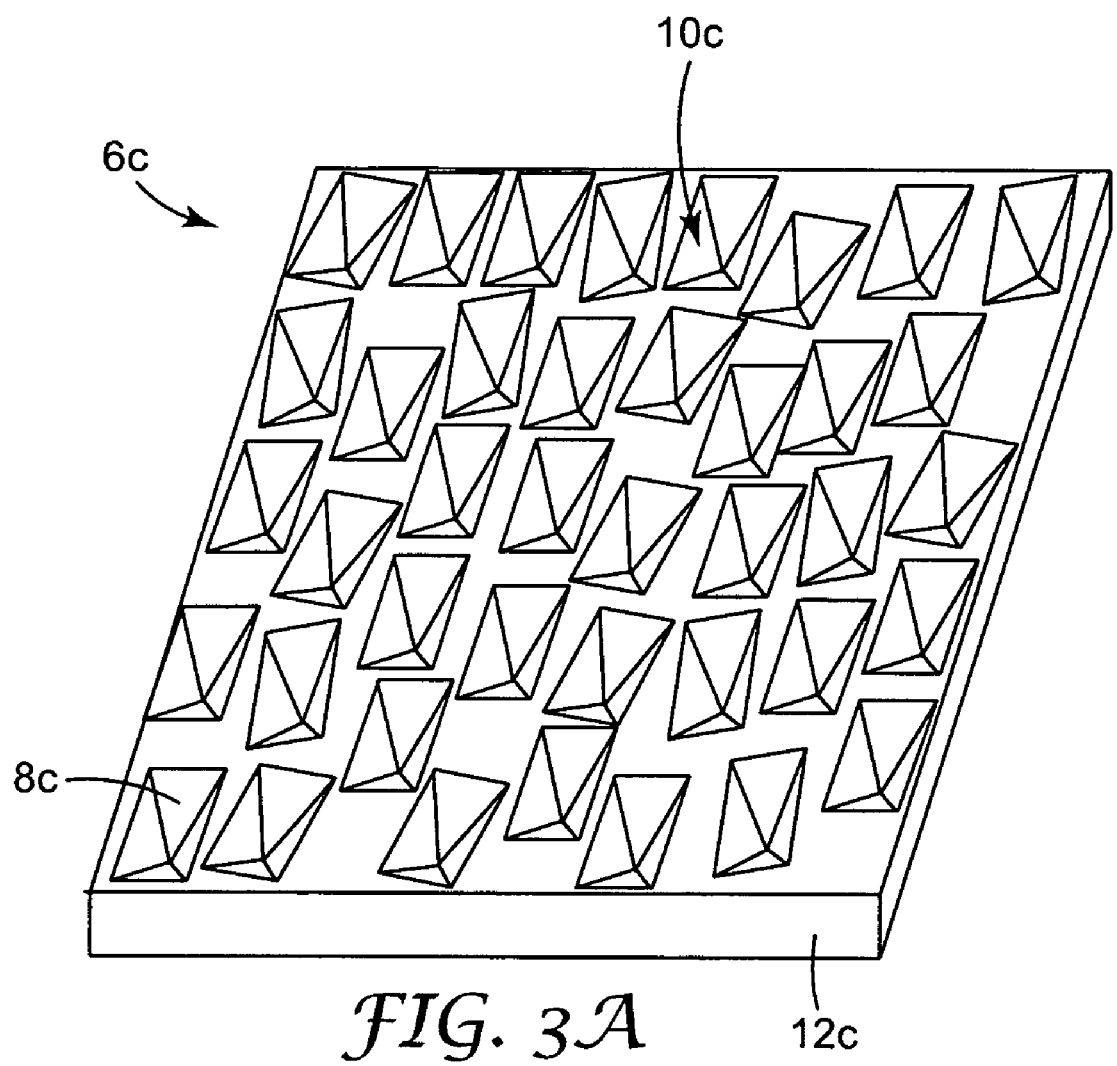
FIG. 3A shows schematically an isometric view of an exemplary embodiment of an optical film according to the present disclosure.
Figure 3B:
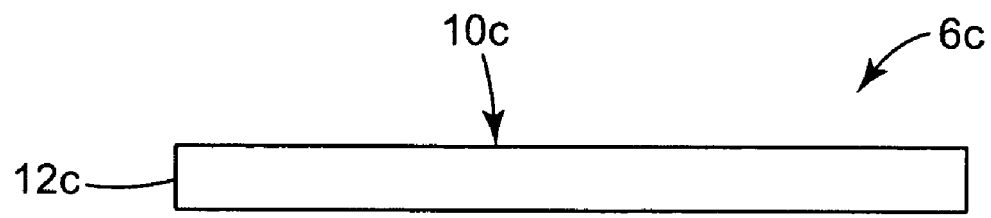
FIG. 3B shows schematically a side view of the optical film illustrated in FIG. 3A.

FIGS. 3A and 3B show one exemplary embodiment of an optical film 6c according to the present disclosure. A structured surface 10c and a substrate portion 12c may be parts of a single film as shown in FIGS. 3A and 3B. The structured surface may include a plurality of pyramid-shaped concave structures 8c offset with respect to each other angularly as well as transversely. In some such exemplary optical films, the concave structures 8c can be arranged in a random distribution. In this exemplary embodiment, the structures 8c have inverted pyramidal shapes with rectangular bases. As one of ordinary skill in the art would understand, the structured surface 10c and the substrate portion 12c may be formed as a single part to produce the optical film 6c, or they may be formed separately and then joined together to produce a single part. The optical film 6c may be manufactured by any method known to those of ordinary skill in the art including, but not limited to, embossing, casting, compression molding, and batch processes.

In an exemplary method of manufacturing an optical film according to the present disclosure, a micro-structured form tool, and optionally an intermediate form tool, may be utilized to form the optical film (e.g. optical film 6c, 6d or 6e). The micro-structured form tool may be made, for example, by cutting groves in two directions on a suitable substrate. As one of ordinary skill in the art will understand, the resultant micro-structured form tool will include a plurality of pyramid-shaped structures resembling the desired optical film. The depth of the cut and spacing between each cut may be adjusted depending on whether the structures with sharp points, flats, or sharp lines along the peaks are desired and depending on other relevant parameters.

An intermediary form tool with a reverse or opposite structure to the micro-structured form tool (e.g. convex pyramidal structures) may be manufactured from the micro-structured form tool using, for example, an electro-plating method or polymer replication. The intermediary form tool may be comprised of polymers including, for example, polyurethane, polypropylene, acrylic, polycarbonate, polystyrene, a UV cured resin, etc. The intermediate tool may be coated with a release layer in order to facilitate release of the final optical film.

As one of ordinary skill in the art will understand, the intermediary form tool may be used to manufacture the optical film (e.g., optical film 6c, 6d or 6e) via direct replication or a batch process. For example, the intermediary form tool may be used to batch process the optical film 6c by such methods as injection molding, UV curing, or thermoplastic molding, such as compression molding. The optical film according to the present disclosure may be formed of or include any suitable material known to those of ordinary skill in the art including, for example, inorganic materials such as silica-based polymers, and organic materials, such as polymeric materials, including monomers, copolymers, grafted polymers, and mixtures or blends thereof. In some exemplary embodiments, a portion carrying the structured surface may be formed from a material with a refractive index lower than that of the substrate portion. In such exemplary embodiments, for a polyethylene terephthalate substrate portion having a refractive index of about 1.66, a preferred range of refractive indices of the portion carrying the structured surface is from about 1.55 to about 1.65, which is the case for acrylic with the refractive index of about 1.58.

Figure 4A:
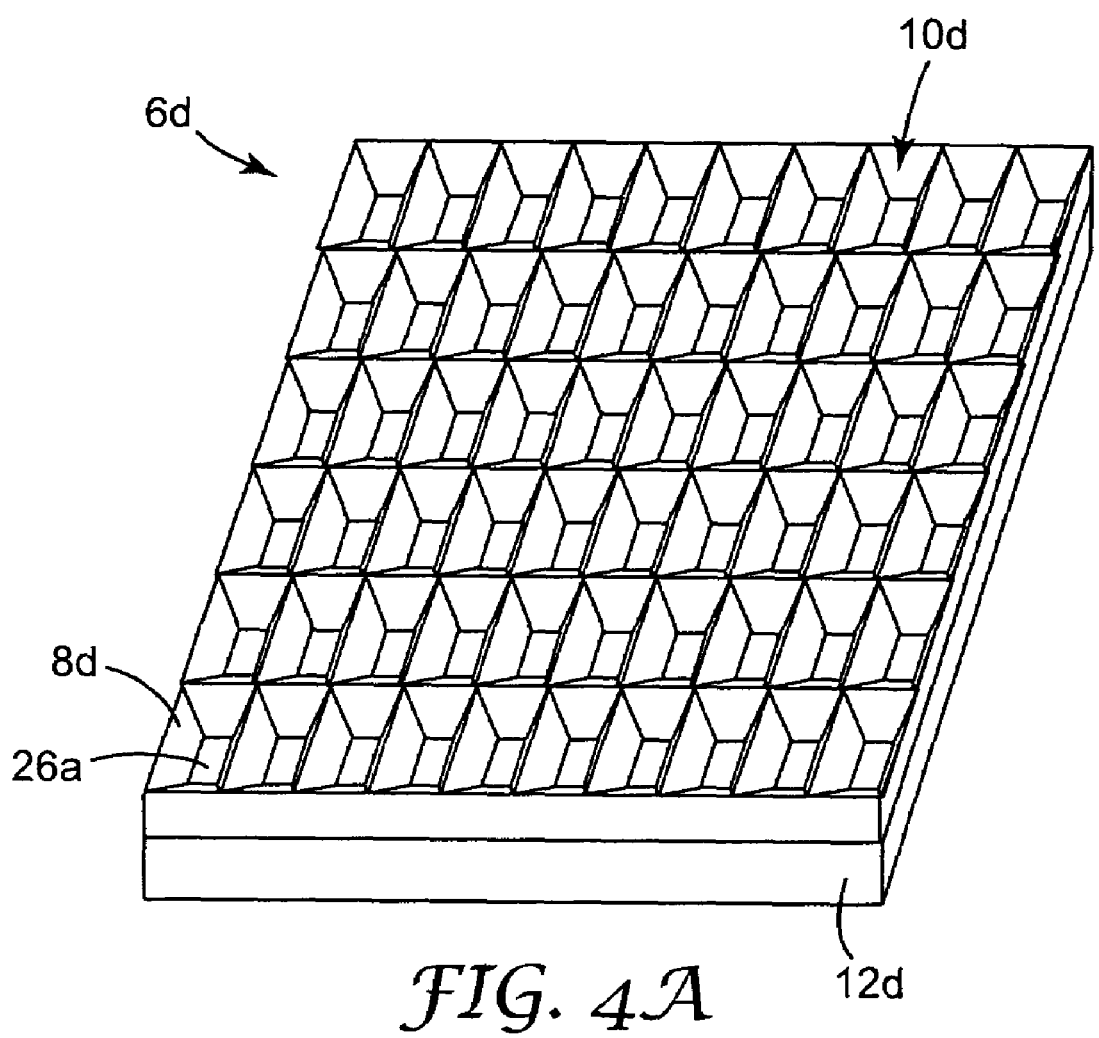
FIG. 4A shows schematically an isometric view of another exemplary embodiment of an optical film according to the present disclosure.
Figure 4B:
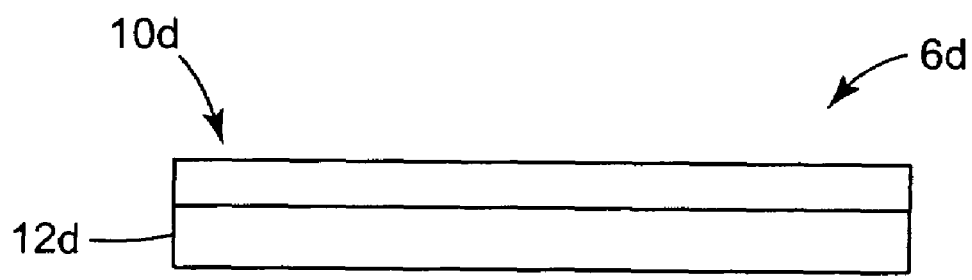
FIG. 4B shows schematically a side view of the optical film illustrated in FIG. 4A.
Figure 5A:
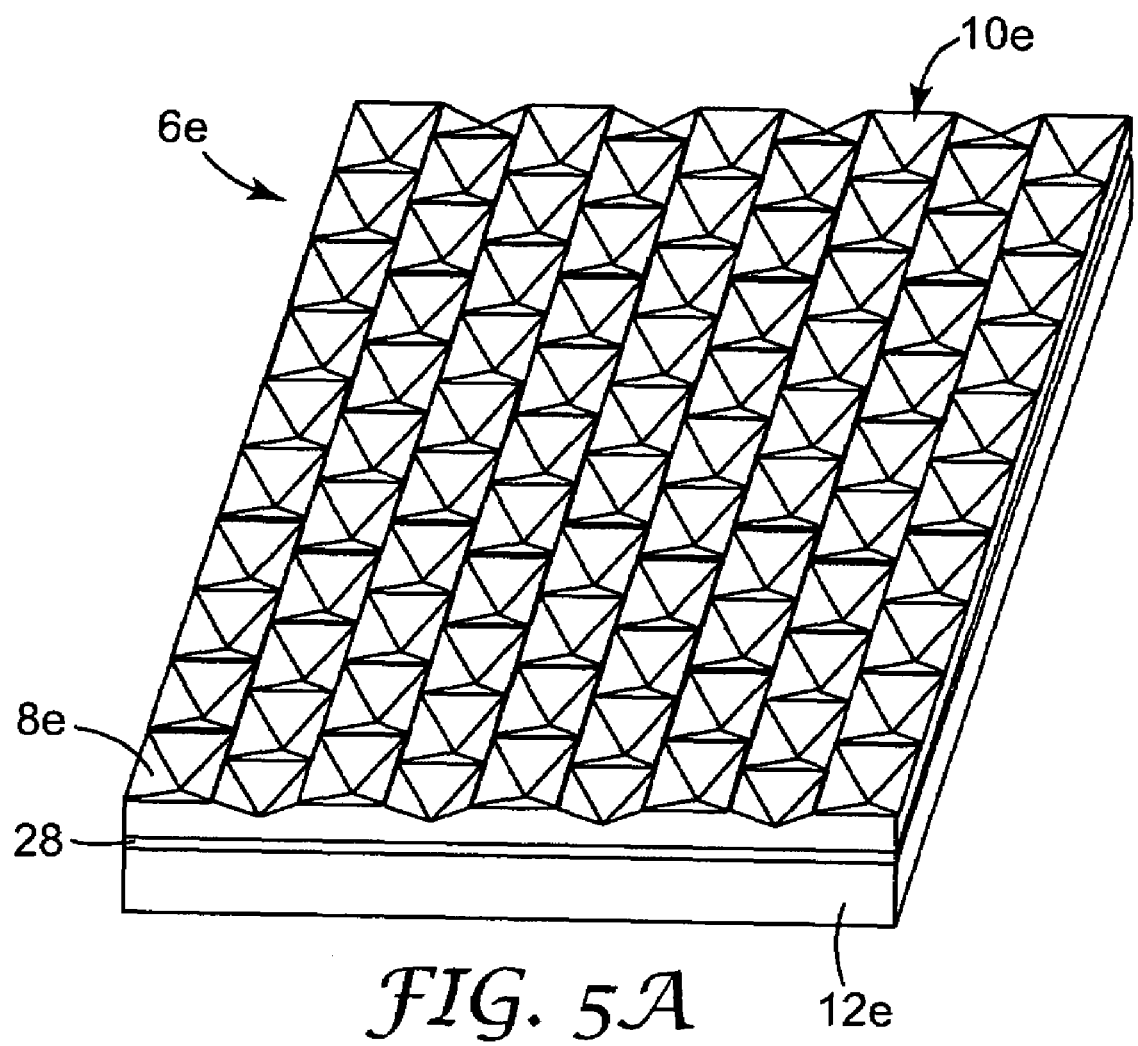
FIG. 5A shows schematically an isometric view of a further exemplary embodiment of an optical film according to the present disclosure.
Figure 5B:
FIG. 5B shows schematically a side view of the exemplary optical film illustrated in FIG. 5A.

FIGS. 4A and 4B show an exemplary embodiment of an optical film 6d according to the present disclosure, FIG. 4A being a schematic perspective view and FIG. 4B being a schematic side view. The exemplary embodiment of the optical film 6d includes a plurality of concave pyramid-shaped structures 8d on a structured surface 10d. In this exemplary embodiment, the concave pyramid-shaped structures 8d have rectangular bases and include an additional planar surface 26a. These exemplary structures 8d are aligned substantially parallel and in substantial contact (e.g., immediately adjacent) with one another. FIGS. 5A and 5B show another exemplary embodiment of an optical film 6e, including a plurality of concave pyramid-shaped structures 8e in an offset distribution. The exemplary structures 8e each have a square base and are disposed in substantial contact (e.g., immediately adjacent) with one another. In other exemplary emobidments of the present disclosure, the structures 8d/8e may be positioned apart from one another so long as the gain of the optical film is no less than 1.1.

As schematically illustrated in FIGS. 4A and 4B, the optical film 6d may be formed from two separate portions: a portion having a structured surface 10d and a substrate portion 12d. This structure may be produced, for example, by coating the substrate portion with a curable material, imparting the structured surface into the curable material, and curing the optical film 6d. Alternatively, a portion having a structured surface 10e and a substrate portion 12e of an optical film 6e may be two separate films bonded together with a suitable adhesive 28, for example, as illustrated in FIGS. 5A and 5B. The adhesive 28 may include, but is not limited to, a pressure sensitive adhesive (PSA) or an ultraviolet (UV) light curable adhesive.

Figure 6A:
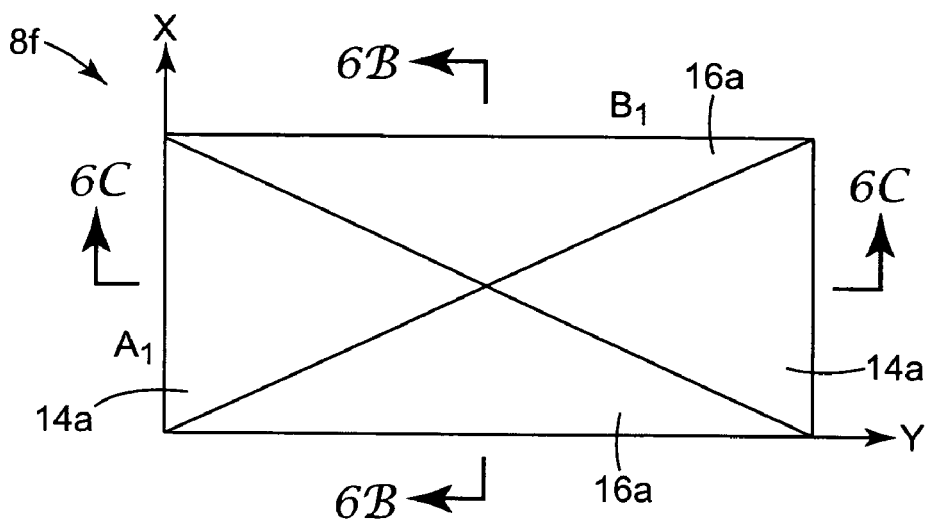
FIG. 6A shows schematically a top view of an individual pyramid-shaped concave structure of an exemplary optical film according to the present disclosure.
Figure 6B:
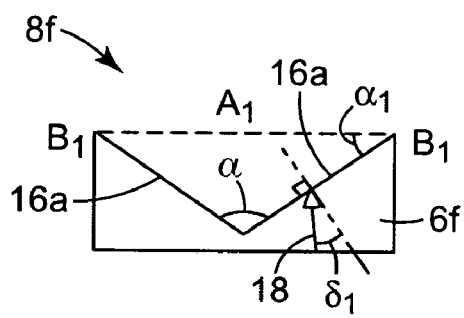
FIG. 6B shows schematically a cross-sectional view of the pyramid-shaped concave structure illustrated in FIG. 6A.
Figure 6C:
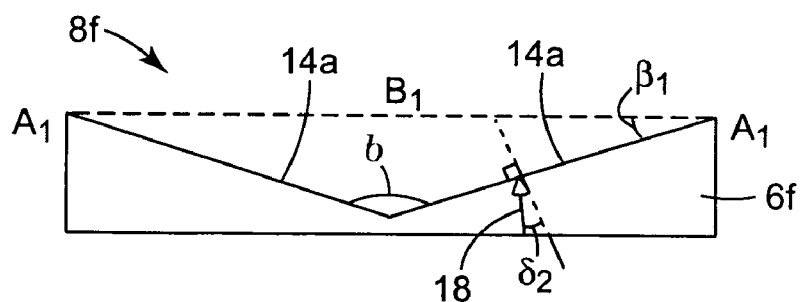
FIG. 6C shows schematically another cross-sectional view of the pyramid-shaped concave structure illustrated in FIG. 6A.

An individual concave pyramid-shaped structure 8f of an optical film 6f according to the present disclosure is shown in FIGS. 6A-6C. FIG. 6A shows a top view of the concave pyramid-shaped structure 8f. The base of the structure 8f may be a four-sided shape with two first sides $A_1$, disposed generally opposite to each other along a direction Y, and two second sides $B_1$, disposed generally opposite to each other along a direction X. In typical embodiments of the present disclosure, the two first sides $A_1$ are substantially parallel to each other and the two second sides $B_1$ are substantially parallel to each other. In some exemplary embodiments, the first sides $A_1$ are substantially perpendicular to the second sides $B_1$. Thus, the base of the concave pyramid-shaped structure 8f may be substantially rectangular. The structure 8f may be further characterised by apex angles a and b, shown in FIGS. 6B and 6C. One of or both the apex angles may be about 90 degrees, about 80 to about 100 degrees or about 60 to about 120 degrees.

FIG. 6B shows a cross-sectional view of the concave pyramid-shaped structure 8f in the 6B-6B plane. The structure 8f includes two surfaces 16a and an angle $\alpha_1$ (alpha) measured between one of the surfaces 16a and a plane parallel to the optical film. FIG. 6C shows a cross-sectional view of an exemplary embodiment of the concave pyramid-shaped structure 8f in the 6C-6C plane. The structure 8f comprises two surfaces 14a and an angle $\beta_1$ (beta) measured between one of the surfaces 14a and a plane parallel to the optical film. In some exemplary embodiments, the angle $\alpha_1$ is at least as great as the angle $\beta_1$, and in other exemplary embodiments it may be larger. In some exemplary embodiments, one of or both the angles $\alpha_1$ and $\beta_1$ can lie within the range of about 30 to about 60 degrees.

FIGS. 6B and 6C show a light ray 18 traveling within the optical film 6f. The surface 16a and the surface 14a may reflect or refract the light ray 18 depending on an incident angle $\delta_1$ or $\delta_2$ of the light ray 18 with respect to a normal to the surface 16a or the surface 14a. As one of ordinary skill in the art will understand from the present disclosure, selecting different angles $\alpha_1$ and $\beta_1$ allows one to control the angular spread of light transmitted through the concave pyramid-shaped structures 8f of an optical film 6 (e.g., optical film 6a-6e). In some exemplary embodiments, the angles between the opposing pairs of surfaces and a plane parallel to the optical film are not equal to each other, which may be advantageous where a viewing axis is tilted with respect to a normal to the optical film.

Figure 7A:
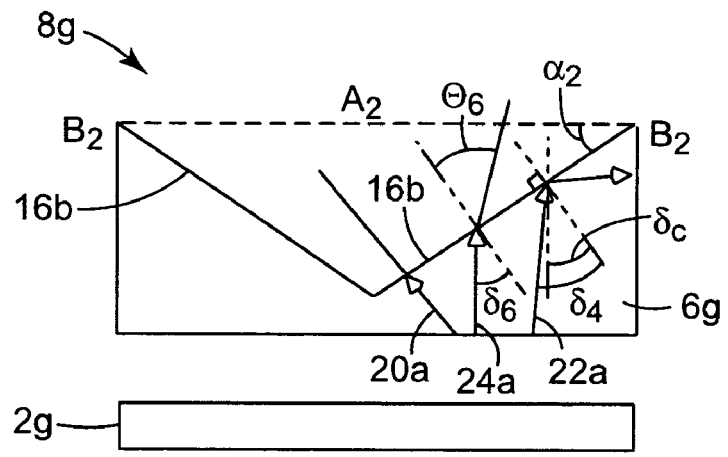
FIG. 7A shows schematically a cross-sectional view of a pyramid-shaped concave structure of an exemplary optical film according to the present disclosure, positioned over a backlight.
Figure 7B:
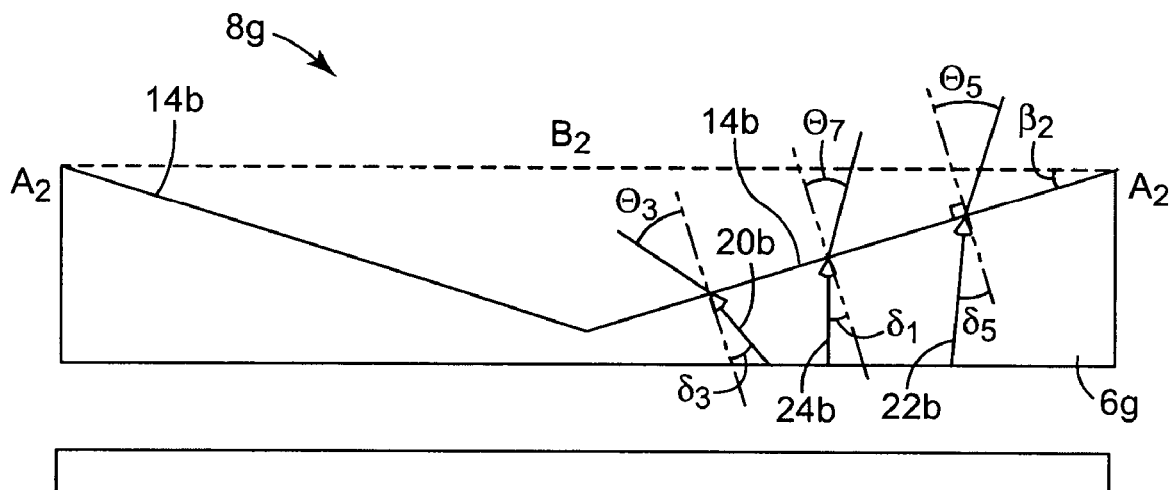
FIG. 7B shows schematically another cross-sectional view of the pyramid-shaped concave structure illustrated in FIG. 7A.

FIG. 7A shows a cross-sectional view of an exemplary embodiment of an optical film 6g illustrating an exemplary concave pyramid-shaped structure 8g similar to the concave pyramid-shaped structure 8f shown in FIG. 6B. A light ray 20a, a light ray 22a, and a light ray 24a, emitted from a backlight 2g, propagate in the optical film 6g. FIG. 7B shows a cross-sectional view of the exemplary embodiment of the optical film 6g and the structure 8g, similar to the cross-sectional view of the structure 8f shown in FIG. 6C. A light ray 20b, a light ray 22b, and a light ray 24b, which have the same directions as light rays 20a, 22a, and 24a respectively, originate from the backlight 2g.

The following describes the travel of each of the light rays 20-24, originating from the backlight 2g, through the optical film 6g. FIGS. 7A and 7B show how a light ray may behave differently depending on whether it first impacts one of the surfaces 16b or one of the surfaces 14b of the concave pyramid-shaped structure 8g, and how the angular spread of light may be controlled in two separate directions by selecting an angle $\alpha_2$ of a surface 16b and an angle $\beta_2$ of a surface 14b. It should be noted that the light rays 20-24 are not drawn to precisely illustrate the angles of reflection and refraction of the light rays 20-24. The light rays 20-24 are only shown to illustrate schematically the general direction of travel of the light rays through the optical film 6g.

In FIG. 7A, the light ray 20a originating from the backlight 2g travels in the optical film 6g toward the concave pyramid-shaped structure 8g in a direction perpendicular to the surface 16b. Thus, the light ray 20a encounters the surface 16b in a direction perpendicular (or normal) to the surface 16b and an incident angle $\delta$ of the light ray 20a relative to the normal of the surface 16b is equal to zero degrees.

A medium above the optical film 6g and the surfaces 16b and 14b of the concave pyramid-shaped structure 8g may be, for example, comprised substantially of air. However, the medium above the optical film 6g and the surfaces 16b and 14b may be comprised of any medium, material, or film known to those of ordinary skill in the art. As one or ordinary skill in the art would understand, air has a refractive index less than most known materials. Based on the principles of Snell's Law, when light encounters, or is incident upon, a medium having a lesser refraction index, the light ray is bent away from the normal at an exit angle θ relative to the normal that is greater than an incident angle δ. However, a light ray which encounters a material-air boundary at surface such that it is normal to the surface (e.g., the light ray 20a) is not bent and continues to travel in a straight line as shown in FIG. 7A. Snell's Law can be expressed by the formula:

$n_i * \sin \delta = n_t * \sin \theta$, where, $n_i$=the refractive index of the material on the side of incident light, δ=the incident angle, $n_t$=the refractive index of the material on the side of transmitted light, and θ=the exit angle.

Those of ordinary skill in the art will understand that a certain amount of the incident light will also be reflected back into the optical film 6g.

FIG. 7B shows the light ray 20b traveling in substantially the same direction as the light ray 20a. The light ray 20b encounters the surface 14b at the incident angle $\delta_3$ relative to a normal to the surface 14b. As discussed above, the angle $\beta_2$ of the surface 14b may be equal to or less than the angle $\alpha_2$ of the surface 16b. In the exemplary embodiment shown in FIGS. 7A and 7B, the angle $\beta_2$ is less than the angle $\alpha_2$. Thus, the incident angle $\delta_3$ of the light ray 20b is not equal to zero as shown in FIG. 7B, and the light ray 20b does not encounter the material-air boundary perpendicular to the surface 14b. The light ray 20b is refracted at an exit angle $\theta_3$ different from the incident angle $\delta_3$ at which it encountered the surface 14b, based on the formula of Snell's Law.

As shown in FIG. 7A, the light ray 22a travels in the optical film 6g and encounters the surface 16b at the incident angle $\delta_4$ relative to the normal to the surface 16b. The incident angle $\delta_4$ for the light ray 22a is greater than the critical angle $\delta_c$ at the surface 16b. The light ray 22a does not exit through the surface 16b and is reflected back into the optical film 6g. This is referred to as "total internal reflection." As described above, the light ray will behave according to the formula for refraction set forth above when traveling from a material having a higher refractive index to a material having a lower refractive index. According to the formula, the exit angle θ will approach 90 degrees as the incident angle increases. However, at the critical angle $\delta_c$, and for all angles greater than the critical angle $\delta_c$, there will be total internal reflection (e.g., the light ray will be reflected back into the structure 8g rather than being refracted and transmitted through the surface). As one of ordinary skill in the art would understand, the critical angle $\delta_c$ may be determined according to the Snell's Law (described above) by setting the exit angle (e.g., refraction angle) to ninety (90) degrees and solving for the incident angle δ.

As shown in FIG. 7B, the light ray 22b, traveling in substantially the same direction as the light ray 22a, encounters the surface 14b. Because the angle $\beta_2$ of the surface 14b is less than the angle $\alpha_2$ of the surface 16b, the light ray 22b encounters the surface 14b at a different incident angle $\delta_5$ than the incident angle $\delta_4$ at which the light ray 22a encountered the surface 16b. The incident angle of light ray 22b is less than the critical angle $\delta_c$ and, therefore, the light ray 22b is refracted at the surface 14b and transmitted through the surface 14b.

The light ray 24a and the light ray 24b, shown in FIGS. 7A and 7B respectively, travel in the optical film 6g in a direction perpendicular to the plane of the optical film. The light rays 24a and 24b encounter the surface 16b and the surface 14b, respectively, at incident angles $\delta$ less than the critical angle $\delta_c$. However, the incident angle $\delta_6$ of the light ray 24a relative to the normal of the surface 16b is greater than the incident angle $\delta_7$ of the light ray 24b relative to the normal of the surface 14b. Hence, according to Snell's Law, the exit angle $\theta_6$ of the light ray 24a relative to the normal of the surface 16b will be different than the exit angle $\theta_7$ of the light ray relative to the normal to the surface 14b. As one of ordinary skill in the art would understand, the exit angle $\theta_6$ of the light ray 24a relative to the normal of the surface 16b generally will be greater than the exit angle $\theta_7$ of the light ray 24b relative to the normal of the surface 14b. However, in the exemplary embodiments where the angle $\beta_2$ is equal to the angle $\alpha_2$, the exit angles $\theta_6$ and $\theta_7$ also may be equal.

Thus, some embodiments of the optical film 6 (e.g., optical film 6a-6g) with concave pyramid-shaped structures 8 (e.g., structures 8a-8g) as described may allow a greater angular spread of light along one direction and a lesser angular spread of light along another direction. For example, the optical film 6 of the present disclosure may be employed in an LCD television to provide a wider angular spread of light in a first direction, e.g., the horizontal direction, and a lesser but still substantial angular spread of light in a second direction, e.g., the vertical direction. This may be advantageous to accommodate the normally wider field of view in the horizontal direction (e.g., viewers on either side of the television) than in the vertical direction (e.g., viewers standing or sitting). In some exemplary embodiments, the viewing axis may be tilted downward, such as where a viewer may be sitting on the floor. By reducing the angular spread of light in the vertical directions, a resultant optical gain may be experienced in a desired viewing angle range. In other exemplary embodiments of the optical film 6, the angular spread of light may be equal in the first and second directions.

Figure 8A:
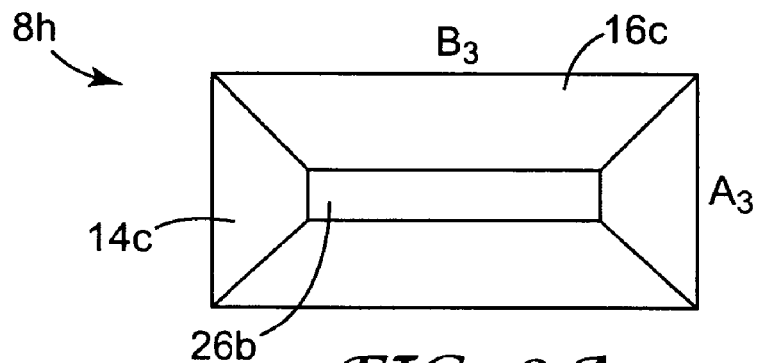
FIG. 8A shows schematically a top view of a generally pyramid-shaped concave structure of an exemplary optical film according to the present disclosure.
Figure 8B:
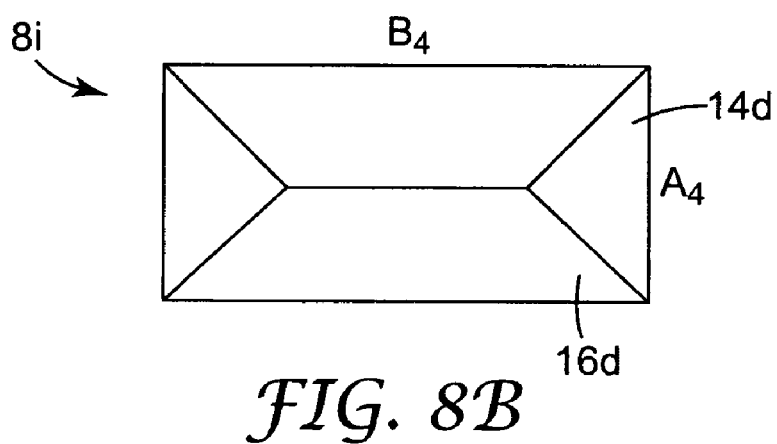
FIG. 8B shows schematically a top view of another generally pyramid-shaped concave structure of an exemplary optical film according to the present disclosure.
Figure 8C:
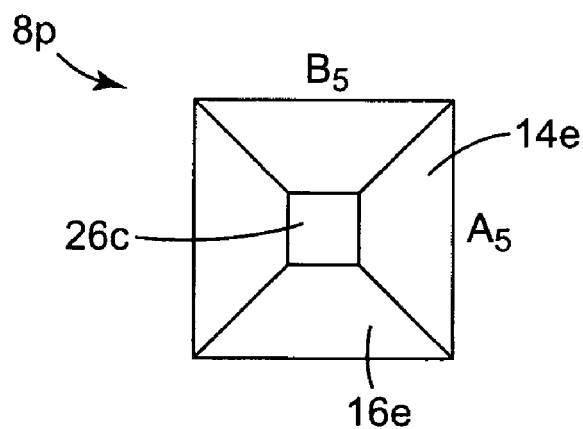
FIG. 8C shows schematically a top view of another generally pyramid-shaped concave structure of an exemplary optical film according to the present disclosure.

FIGS. 8A-8C illustrate further exemplary embodiments of one of the concave pyramid-shaped structures according to the present disclosure. FIG. 8A shows a concave structure 8h having two opposing first sides $A_3$ and two opposing second sides $B_3$; the length of $A_3$ is less than the length of $B_3$. The concave pyramid-shaped structure 8h also includes two surfaces 14c and two surfaces 16c. In this exemplary embodiment, the structure 8h further includes a substantially flat surface 26b which occupies a sufficiently small area to maintain an optical gain of at least 1.1. The flat surface 26b may aid in transmitting more light in the direction perpendicular to the display (i.e., the direction along which the viewer is most likely to view the screen). The surface 26b may be raised or it may be depressed. In some exemplary embodiments, the surface 26b may be rounded.

FIG. 8B shows a concave pyramid-shaped structure 8i having two opposing first sides $A_4$ and two opposing second sides $B_4$. In this exemplary embodiment, the two surfaces 14d are of a substantially triangular shape and the two surfaces 16d are of a substantially trapezoidal shape. It is contemplated that the concave pyramid-shaped structures 8i may be of any other general construction with two opposing first sides $A_4$ and two opposing second sides $B_4$ and the surfaces 14d and 16d.

FIG. 8C shows another concave pyramid-shaped structure 8p having two opposing first sides $A_5$ and two opposing second sides $B_5$; the length of $A_5$ is the same as the length of $B_5$. The structure 8p also includes two surfaces 14e and two surfaces 16e. The concave pyramid-shaped structure 8p further includes a surface 26c, which may be flat or rounded.

Figure 9A:
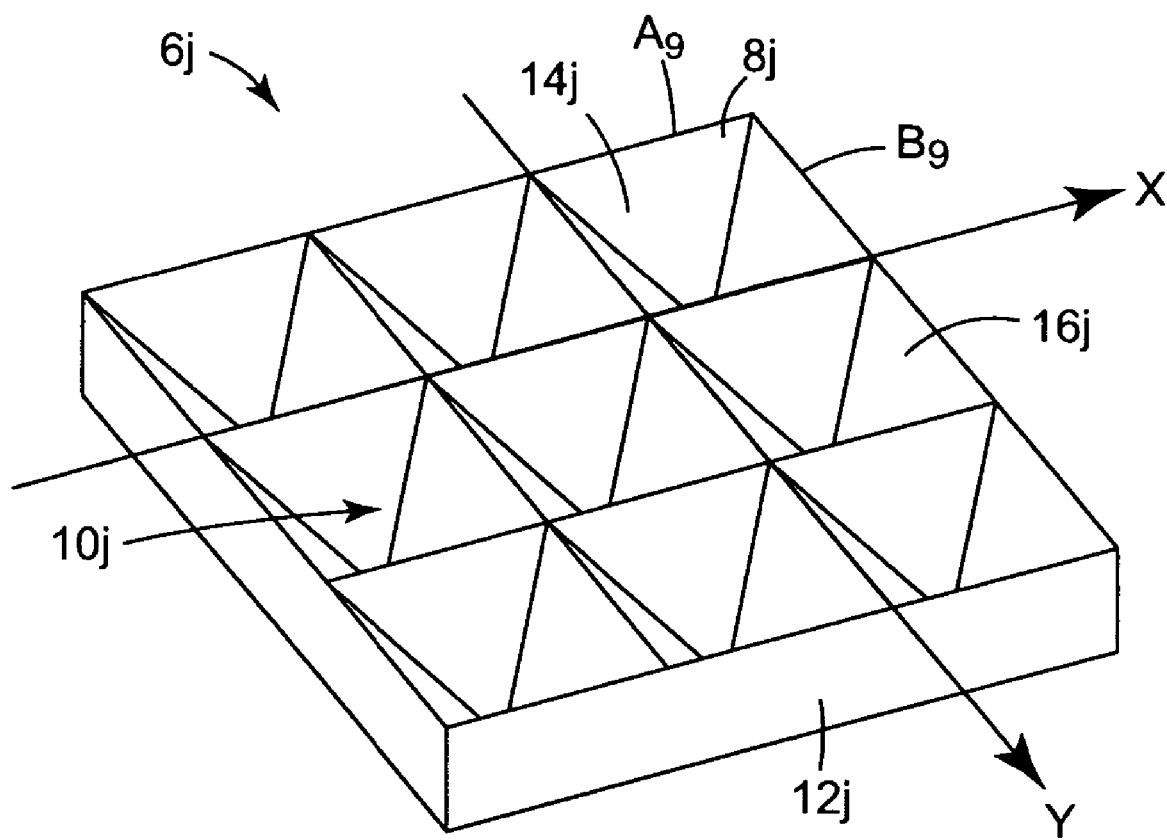
FIG. 9A shows schematically an isometric view of a further exemplary embodiment of an optical film according to the present disclosure.

FIG. 9A shows another exemplary optical film, 6j, according to the present disclosure. The exemplary optical film 6j includes a portion having a structured surface 10j with a refractive index of approximately 1.58, and a substrate portion 12j having a refractive index of approximately 1.66. The structured surface 10j includes a plurality of concave pyramid-shaped structures 8j. A base of each of the structures 8j was modeled as a four-sided shape with two first sides $A_9$, disposed generally opposite to each other along a direction Y, and two second sides $B_9$, disposed generally opposite to each other along a direction X. In this exemplary embodiment, the lenghts of all sides were equal and set to 50 microns. Each structure 8j also includes two surfaces 14j and two surfaces 16j. The apex angles between the surfaces 14j and 16j were both set to about 90 degrees. As shown in FIG. 9A, each of the surfaces 14j meets one of the first sides $A_9$ and each of the surfaces 16j meets one of the second sides $B_9$. The surfaces 16j and 14j in the exemplary embodiment shown are situated at a surface angle of forty-five (45) degrees to a plane parallel to the optical film, such that the depth of each concave pyramid-shaped structure is a half of the side length. However, in other exemplary embodiments, other depth to side length ratios and other angles may be desired.

Figure 9B:
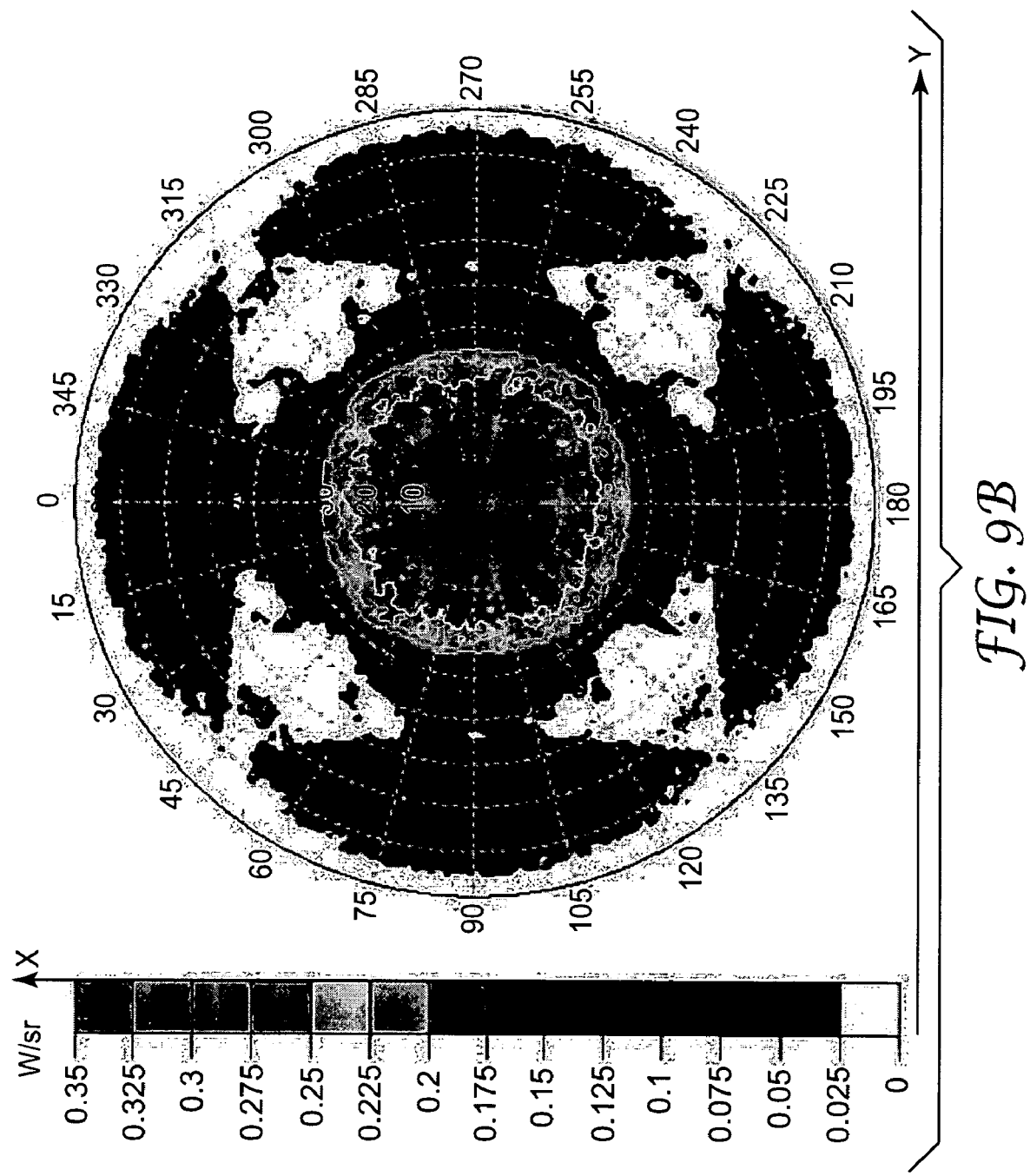
FIG. 9B shows a polar iso-candela plot for the optical film illustrated in FIG. 9A.

FIG. 9B shows a modeled polar iso-candela distribution plot for the optical film 8j illustrated in FIG. 9A. The distribution was calculated using the following model: an extended Lambertian source was used on the first pass of light through the optical film and the remaining light was recycled using a Lambertian reflector with a reflectivity of about 77.4%. As one of ordinary skill in the art will understand, a polar iso-candela distribution plot shows a three hundred and sixty (360) degree pattern of detected incident light rays having passed through an optical film. As shown in FIG. 9B, the distribution of the light transmitted through the optical film along the Y direction is similar to the distribution along the X direction. The distributions would be different if the lengths of the first sides were sufficiently different from the second sides. In the latter case, the distribution (and the viewing angle) would typically broaden along the direction substantially parallel to the longer sides.

Figure 9C:
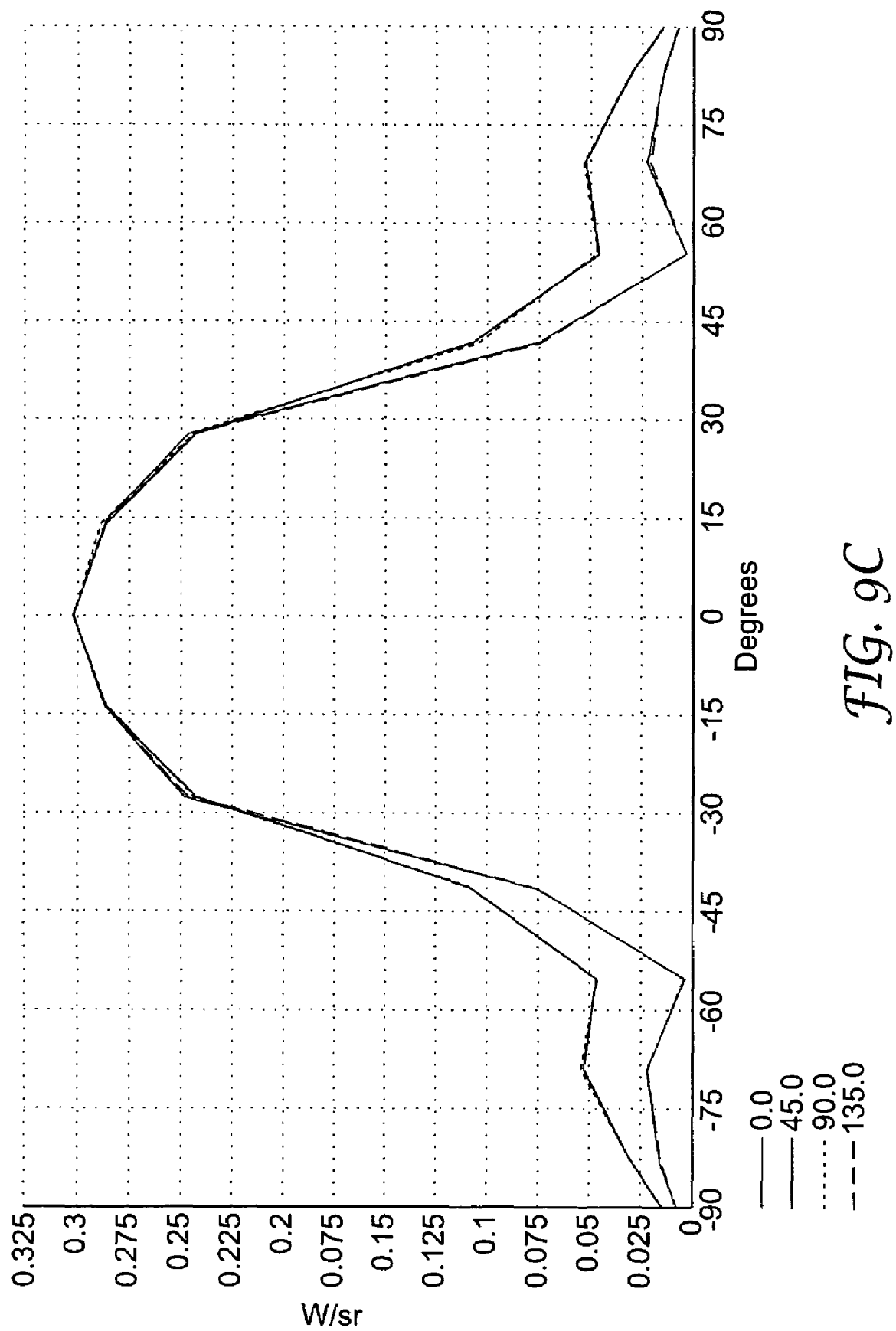
FIG. 9C shows a rectangular candela distribution plot for the optical film illustrated in FIG. 9A.

FIG. 9C shows rectangular candela distribution plots corresponding to the polar plot shown in FIG. 9B. As one of ordinary skill in the art will understand, the rectangular candela distribution plots show the distribution of light transmitted through the optical film 6j at different angles. Each curve on the rectangular distribution plots corresponds to a different cross-section of the polar plot. For example, the curve designated as 0 degrees represents the cross-section of the polar plot along the line passing through the center that connects 0 and 180 degrees, the curve designated as 45 degrees represents the cross-section of the polar plot along the line passing through the center that connects 45 and 225 degrees, the curve designated as 90 degrees represents the cross-section of the polar plot along the line passing through the center that connects 90 and 180 degrees, and the curve designated as 135 degrees represents the cross-section of the polar plot along the line passing through the center that connects 135 and 315 degrees. Notably, the rectangular candela plots also demonstrate similar light-distribution properties along the two orthogonal directions, corresponding to X and Y in FIG. 9A. Again, for concave structures with different lengths of the sides, in some exemplary embodiments, the distribution can be broadened along the direction substantially parallel to the longer sides.

It will be apparent to those skilled in the art that various modifications and variations can be made in the structure and the methodology of the present disclosure, without departing from the spirit or scope of the invention. Thus, it is intended that the present disclosure cover the modifications and variations of the exemplary embodiments described herein, provided that they come within the scope of the appended claims and their equivalents.

What is claimed is:

1. An optical device comprising:
a light source and an optical film having a first surface disposed to receive light from the light source and a structured surface facing away from the light source, the structured surface comprising a plurality of concave pyramid-shaped structures, each structure having a base including at least two first sides and at least two second sides, wherein each of the plurality of concave pyramid-shaped structures comprises five substantially planar surfaces, four surfaces being attached to the base, each of the four surfaces positioned to angle in from the base toward the fifth surface, wherein the two first sides are disposed opposite to each other along a first general direction and the two second sides are disposed opposite to each other along a second general direction, wherein the optical film transmits a substantial portion of light incident thereon along the first general direction when an angle of incidence is within a first angle with respect to an axis disposed at an angle to the first surface and reflects a substantial portion of light when the angle of incidence is outside the first angle, and wherein the optical film transmits a substantial portion of light incident thereon along the second general direction when an angle of incidence is within a second angle with respect to the axis and reflects a substantial portion of light when the angle of incidence is outside the second angle.

2. The optical device as recited in claim 1, wherein the axis is generally orthogonal to the first surface.

3. The optical device according to claim 1, wherein the first angle is different from the second angle.

4. The optical device according to claim 1, wherein the base has a generally rectangular or a generally square shape.

5. The optical device according to claim 1, wherein each of the plurality of concave pyramid-shaped structures is further characterized by an apex angle that lies within a range of about 60 degrees to about 120 degrees.

6. The optical device according to claim 1, wherein each concave pyramid-shaped structure is arranged in a substantial contact with at least one other concave pyramid-shaped structure.

7. The optical device according to claim 1, wherein the bases of the plurality of concave pyramid-shaped structures are disposed so that at least one of the first and second sides are substantially parallel to one another.

8. The optical device according to claim 1, wherein the optical film further comprises a substrate portion disposed between the light source and the structured surface, the substrate portion having an additional optical characteristic different from an optical characteristic of the structured surface.

9. The optical device according to claim 8, wherein the substrate portion comprises at least one of: a polarizer, a diffuser, a brightness enhancing film, a turning film and any combination thereof.

10. The optical device according to claim 1, further comprising a light valve arrangement disposed to receive light transmitted through the optical film.

11. The optical device according to claim 1, further comprising a lightguide optically connected to the light source and disposed between the light source and the optical film.

* * * * *